July 29, 1947.   R. BLACK, JR., ET AL   2,424,549
SUBMARINE SIGNAL DETECTOR OR RECEIVER
Filed July 14, 1943   2 Sheets-Sheet 1

INVENTORS R. BLACK, JR.
F. F. ROMANOW
BY
Walter E. Kiesel
ATTORNEY

INVENTORS: R. BLACK, JR.
F. F. ROMANOW
BY Walter C. Kiesel
ATTORNEY

Patented July 29, 1947

2,424,549

UNITED STATES PATENT OFFICE 2,424,549

SUBMARINE SIGNAL DETECTOR OR RECEIVER

Robert Black, Jr., South Orange, and Frank F. Romanow, Summit, N. J., assignors to Bell Telephone Laboratories, Incorporated, New York, N. Y., a corporation of New York Application July 14, 1943, Serial No. 494,741

7 Claims. (Cl. 177—386)

This invention relates to compressional wave signal translating devices and more particularly to submarine signal detectors or receivers especially suitable for use in systems for detecting and locating submerged bodies such as submarines.

One object of this invention is to obtain a markedly directional characteristic or response pattern for submarine signaling devices.

Another object of this invention is to realize a large directional discrimination by a submarine signal detector or receiver, throughout a wide frequency range.

Another object of this invention is to increase the operating frequency range of submarine signaling devices.

A further object of this invention is to facilitate control of the operating frequency range in submarine signaling devices.

A still further object of this invention is to facilitate the construction of directional submarine signal detectors or receivers.

In one illustrative embodiment of this invention, a hydrophone comprises a substantially spherical housing or shell of sufficient rigidity to vibrate substantially bodily without breaking up or local resonances throughout the intended operating frequency range, and signal translating means mounted within the housing or shell and actuated in accordance with vibrations thereof. In one construction, the signal translating means comprises a pair of inertia type, electromechanical transducer units aligned diametrically of the housing and each having its driving member coupled thereto.

In accordance with one feature of this invention, means are provided for producing a phase shift between compressional wave forces acting upon the housing or shell in opposite directions along the axis of vibration of the translating means so that the response of the signaling device is a function of the angle of incidence of the compressional waves upon the device. In one construction, the housing or shell is provided with a cover highly transparent to compressional wave energy and an insert is positioned in the cover in alignment with the axis of vibration of the translating means, the insert constituting an acoustic network having mass, stiffness and resistance correlated so that the response of the device is a maximum for signal waves incident upon the cover in one direction along the axis noted and is considerably smaller or a minimum for waves incident upon the cover in another direction, for example the direction 180 degrees from the direction for maximum response.

In accordance with another feature of this invention, the transducer unit, or units, has its driving member connected to the housing or shell by a compliant member of a stiffness correlated with the mass of the unit to produce a resonance at a frequency near the upper end of the frequency range to be translated whereby the response at the high frequencies in this range is materially enhanced.

The invention and the above-noted and other features thereof will be understood more clearly and fully from the following detailed description with reference to the accompanying drawing in which.

Figure 1:
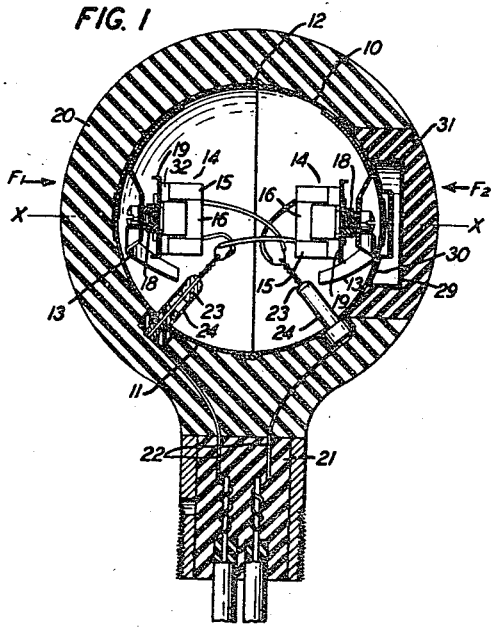
Figs. 1 and 2 are sectional views, taken at right angles to each other, of a submarine signaling device illustrative of one embodiment of this invention.
Figure 2:
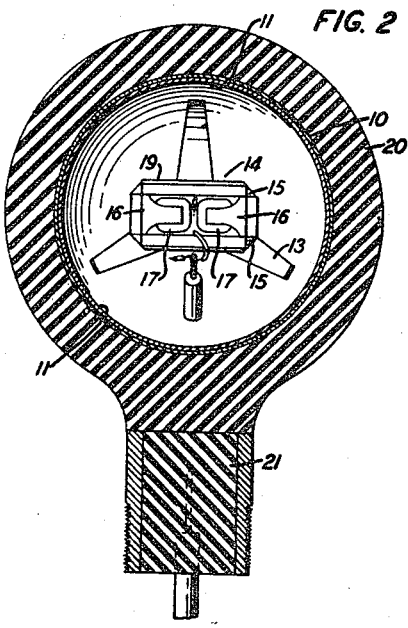
Figure 3:
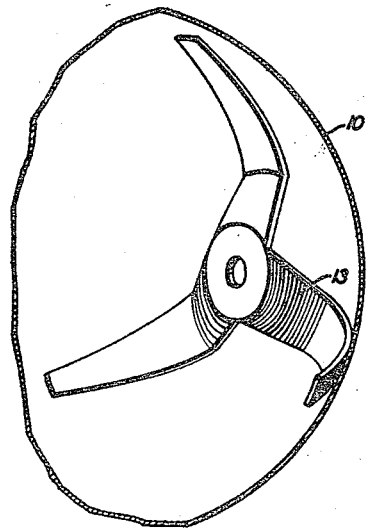
Fig. 3 is a detail perspective view of the compliant supports for the transducer units included in the device illustrated in Figs. 1 and 2.

Referring now to the drawing, the signaling device illustrated in Figs. 1 and 2 is a hydrophone adapted for the detection of compressional wave signals throughout a wide frequency range, for example, the band from the order of 300 to 15,000 cycles per second. It comprises a substantially spherical, water-tight housing or shell composed of two similar parts 10 and 11 joined to one another, as by brazing as indicated at 12. The housing or shell is made as light weight as feasible and sufficiently rigid to vibrate bodily without local vibrations therein throughout the intended operating frequency range. For example, in a device adapted for operation up to of the order of 15,000 cycles per second, the housing or shell may be approximately two inches in diameter and of formed steel .025 inch thick. Each of the parts 10 and 11 carries a compliant support or spider 13 the arms of which are secured suitably to the respective part as by spot welding. As shown in Fig. 2, the two spiders or supports 13 are aligned along a diameter of the housing or shell.

Each of the spiders 13 mounts an inertia type transducer unit, which may be of the construction disclosed in Patent 2,202,906, granted June 4, 1940, to Melville S. Hawley. The transducer units, designated generally as 14, comprise a pair of bar magnets 15 joined to U-shaped pole-pieces 16 which carry signal coils 17. A magnetic armature 18 overlies the inner tips of the pole-pieces and is coupled to the outer pole ends by a flat spring 19. As shown in Figs. 1 and 2, the two transducer units are aligned along a diameter of the housing or shell. Each armature is secured at its center to the center of the corresponding support or spider 13. The two transducer units may be connected in parallel or in series electrically depending upon the desired impedance. Vibrations of the housing or shell 10 are communicated to the armatures 18 by the respective support or spider and, because of the mass of the magnets and pole-pieces and the resilient coupling of the armature to the pole-pieces, relative motion occurs between each armature and the associated magnetic structure, whereby the reluctance of the armature to pole-piece gaps is varied and signal voltages are induced in the coils 17.

The housing or shell 10, 11 is provided with a resilient cover 20 intimately joined thereto and highly transparent to compressional wave energy, for example, of a high quality rubber substantially free of air pockets vulcanized to the shell, the cover 20 having a resilient stem 21 integral therewith or joined thereto. Leading in connection to the transducer units is established by conductors 22 embedded in the cover and stem and sealed in glass beads 23 sealed to eyelets 24 secured to the shell or housing, as illustrated in Fig. 1.

Figure 4:
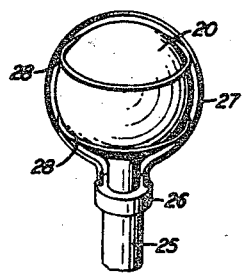
Fig. 4 is a perspective view to a reduced scale showing one manner of mounting the signaling device illustrated in Figs. 1 and 2.

The signaling device is mounted so as to be vibratile bodily in response to compressional waves incident thereon. For example, it may be mounted, as shown in Fig. 4, upon a support of the general construction disclosed in the application Serial No. 494,640, filed July 14, 1943, of William R. Harry. The support comprises a hollow rigid standard 25 adapted for attachment to the hull of a ship and having a collar 26 thereon in which the stem 21 is held. Extending from the collar is a metallic framework including a vertical frame piece 27 and a pair of transverse rings 28 each of which is secured to the frame piece and is of such diameter as to intimately engage the resilient cover 20 for the shell or housing. The framework prevents large amplitude motion of the hydrophone due to the forces acting thereon when the vessel from which it is mounted is in motion but does not affect vibration thereof in response to compressional wave signals even when the vessel is traveling at moderate speeds, i. e., of the order of 10 knots.

As pointed out hereinabove, the transducer units are actuated in accordance with vibrations of the housing or shell 10, 11, the direction of vibration of the armatures 18 being generally normal to the plane thereof, i. e., along the X—X axis indicated in Fig. 1. It will be appreciated that when the hydrophone is mounted in the manner illustrated in Fig. 4, there are two opposed components of force effective upon the shell 10, 11 in the direction of vibration of the armatures, due to compressional wave signals incident upon the hydrophone. The amplitude of the motion of the shell is dependent upon the resultant of these forces. In accordance with a feature of this invention, means are provided to produce a prescribed phase relation between the two force components noted so that the motion of the shell in response to compressional waves is a function of the angle of incidence of the waves and, therefore, the response of the hydrophone is dependent upon the direction of the signal source with respect to the hydrophone, and generally speaking, is a maximum for waves incident upon the housing in the direction indicated by the arrow $F_1$ in Fig. 1 and is relatively small or a minimum for waves incident in the opposite direction, indicated by the arrow $F_2$ in Fig. 1.

Specifically, as shown in Fig. 1, a portion of the cover 20 in line with the axis of the alignment of the transducer units 14 is cut away to receive an insert composed of a capsule 29, the face 30 of which conforms to the shell 10, 11, and a cap or cover 31 enclosing the capsule and joined intimately to the cover 20. The cap or cover 31 is of a material having a high dissipative resistance; for example, it may be of butyl rubber and vulcanized to the cover 20. The capsule 29 and cap or cover 31 constitute an acoustic phase shifting element composed of a shunt stiffness, due to the volume of air enclosed in the capsule, and a series mass and resistance, due to the rubber cap or cover 31, with reference to the shell 10, 11. As noted heretofore, the cover 20 is highly transparent to compressional wave energy so that such energy is transmitted therethrough to the shell 10 without substantial attenuation or alteration in phase. The insert 29, 31, however, both attenuates and alters the phase of energy transmitted therethrough. Thus, it will be seen that the insert is effective to vary the resultant of the two opposed forces, acting in the direction of the arrows $F_1$ and $F_2$, effective upon the housing or shell 10 due to compressional waves.

The character of the effect of the phase shifting network defined by the insert is dependent, of course, upon the impedances constituting this network and the form of the directional pattern is dependent upon these impedances and the path length, through the sea water, between the insert and the diametrically opposite portion of the shell 10, 11. Maximum discrimination between incidence angles of 0 and 180 degrees, the zero direction corresponding to the direction of the force $F_1$ and the 180 direction corresponding to the direction of the force $F_2$, and a fairly uniform discrimination throughout a wide frequency band is realized by correlation of the resistive and reactive components of the series mass and resistance combination with respect to the shunt stiffness and path difference. Specifically, the relations for maximum discrimination are $$Z_R = \frac{S_5}{\omega} \sin \frac{\omega D}{C}$$

and $$Z_X = \frac{2S_5}{\omega} \sin^2 \frac{\omega D}{2C}$$

where $Z_R$ = the resistive component noted
$Z_X$ = the reactive component noted
$S_5$ = the stiffness of the enclosed volume of air in the capsule 29
$\omega$ = $2\pi$ times the frequency
$D$ = the path length between the diametrically opposite parts of the shell and
$C$ = the velocity of sound in sea water.

The optimum relation of the resistive and reactive components noted is obtained, in general, when these components are substantially matched at an intermediate frequency in the band to be reproduced, consideration being taken of the frequency at which the diffraction effect of the housing becomes of substantial magnitude.

In a particular construction wherein the shell 10, 11 is substantially two inches in diameter and the covering 20 is approximately one-half inch thick, the diffraction effect is of substantial magnitude at of the order of 12,000 cycles per second. The resistive and reactive components are matched at about 2500 cycles per second. The actual dimensions of the phase shifting network defining elements found satisfactory are

|  | Inches |
|---|---|
| Diameter of capsule 29 | 1 |
| Minimum depth of capsule 29 | 1/8 |
| Minimum thickness of cap or cover 31 | 1/4 |

Figure 5:
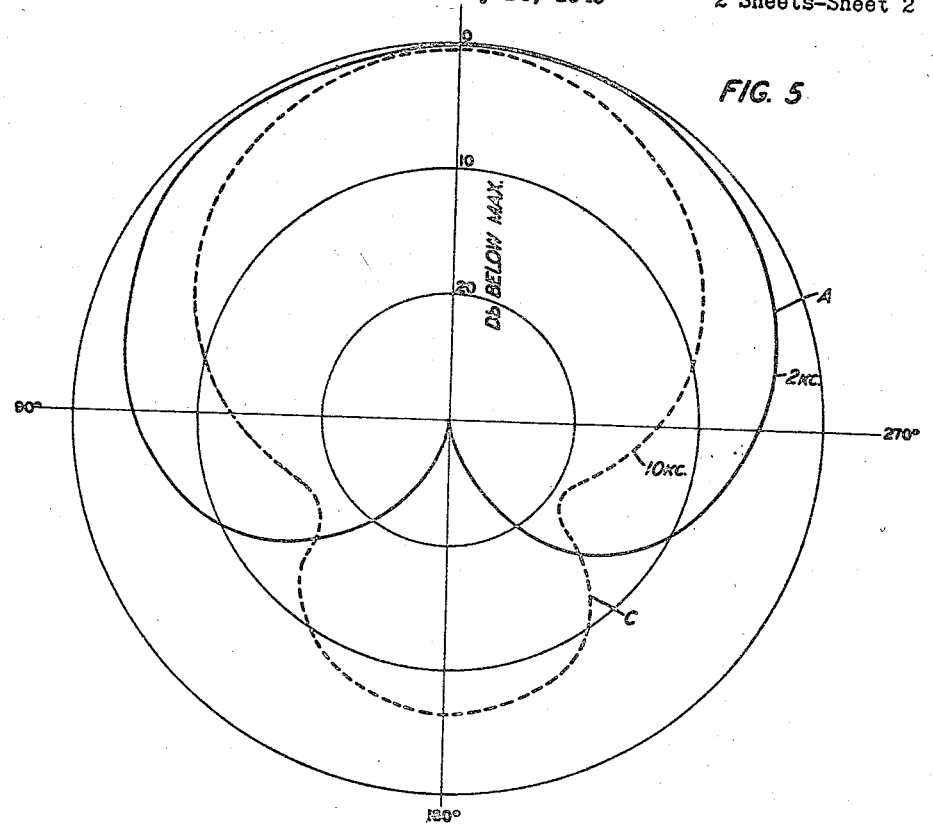
Fig. 5 is a graph showing typical directional patterns at several frequencies for a device of the construction shown in Figs. 1 and 2.

The directional characteristic for a device of these dimensions is illustrated in Fig. 5 wherein the curve A shows the pattern at 2 kilocycles per second and curve C the pattern at 10 kilocycles per second. Curve A, it will be seen is essentially a cardioid whereas curve C departs from a true cardioid form. The departure, it is found, is decidedly advantageous. As is apparent, the main lobe for the higher frequency curve C is considerably sharper than for the low frequency curve A. Hence, greater directionality is obtained at high frequencies. Further, such sharper lobe results in an improved signal-to-noise ratio at the higher frequencies in the band to be translated.

In the use of the device, advantageously filters are provided in the amplifier circuit associated therewith to reduce the noise at the low frequency end of the range, for example, between 500 to 1,000 cycles, whereby a high signal-to-noise ratio throughout the range to be translated is realized.

Generally, inertia type transducer units of the type illustrated and described have a fairly pronounced resonance peak in the response characteristic near the low frequency end of the range to be translated. For example, in a typical device, the unit has a fairly pronounced resonance peak at approximately 500 cycles. The resonance peak may be substantially suppressed and an improvement in response obtained by damping the spring 19. In one construction, pads 32 of resilient material, such as butyl rubber, are provided between and in engagement with the spring 19 and the magnets 15. Such pads shift the resonance peak, for example to about 900 cycles, and flatten out the response characteristic.

The spiders 13 enable control of the high frequency response of the device. Each spider together with the portion of the shell between the arms thereof provides a stiffness which is resonant with the mass of the center portion of the spider and the transducer unit joined thereto. By correlation of the mass and stiffness in ways known in the art, the frequency at which the resonance occurs can be determined. This enables enhancement of the high frequency response of the signaling device and extension of the frequency range thereof. In a specific device of the construction illustrated and described, the mass and stiffness noted were correlated to be resonant at approximately 14,000 cycles whereby the range of the device was extended to about 15,000 cycles.

Figure 6:
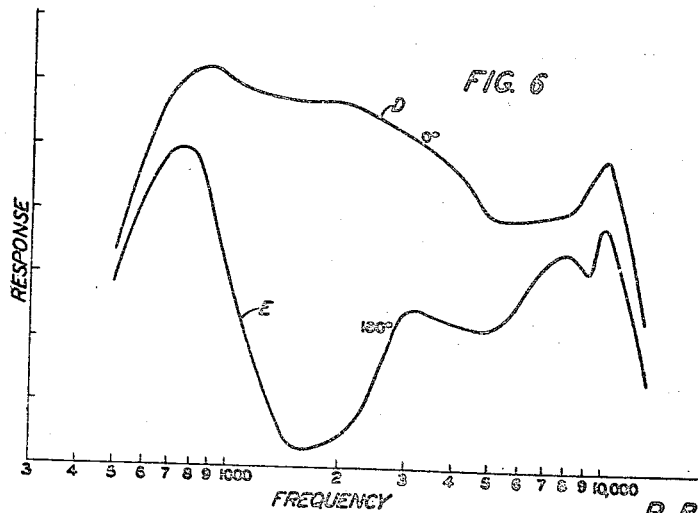
Fig. 6 is a typical response curve for the signaling device illustrated in Figs. 1 and 2.

Typical response curves for a device of the construction shown and described are illustrated in Fig. 6, wherein curve D shows the response for zero incidence angle and curve E shows the response for 180-degree incidence. As is clear from this figure, a substantially uniform response and marked directional discrimination are obtained throughout a wide range of frequencies, from about 500 to 15,000 cycles per second.

Although the invention has been described with particular reference to a device including two transducer units, it may be practiced in devices embodying a single unit or more than two units. For example, four units may be employed, two being mounted from each spider 13 by a suitable bar or plate. The use of two or more units is advantageous in that, by parallel connection thereof, a lower operating impedance with the same voltage is obtained whereby an improved efficiency is realized.

It will be understood that the device shown and described is but illustrative of the invention and that various modifications may be made therein without departing from the scope and spirit of this invention as defined in the appended claims.

What is claimed is:

1. A submarine signaling device comprising a vibratile housing, electromechanical transducer means within said housing and actuable in accordance with vibrations thereof, and means upon a portion of said housing for producing a phase difference between the opposed forces acting upon said portion and a second portion opposite thereto due to compressional signal waves incident upon the housing.

2. A submarine signal detector comprising a bodily vibratile, substantially spherical shell, an inertia type transducer unit within said shell and having its driving element coupled thereto, and means mounted on said shell defining an acousto-mechanical network effective to produce a phase difference between the opposed forces acting upon said shell due to compressional waves incident thereon.

3. A hydrophone comprising a bodily vibratile housing, an inertia type transducer within said housing and having its driving member coupled thereto, said unit having its axis of vibration substantially coincident with an axis of said housing, means on said housing in alignment with said axis thereof defining a chamber, and means upon the outer wall of said chamber defining means defining a mass and resistance which together with the stiffness of said chamber constitute a phase shifting network between points on said housing on opposite sides thereof and along said housing axis.

4. A submarine signaling device comprising a bodily vibratile, substantially spherical shell, an inertia type transducer unit within said shell and having its axis of vibration substantially coincident with a diameter thereof, means coupling the driving element of said unit to said shell, a cover on said shell highly transparent to compressional wave energy, said cover having an opening therein in alignment with said diameter, and an insert in said opening defining an acousto-mechanical phase shifting network having mass, stiffness and resistance.

5. A submarine signaling device in accordance with claim 4 wherein said insert comprises an air-filled capsule and a cover having substantial dissipative resistance upon a wall portion of said capsule.

6. A submarine signal detector comprising a bodily vibratile, substantially spherical shell, an inertia type transducer unit within said shell and having its driving element coupled thereto, the axis of vibration of said unit being along a diameter of said shell, a sonically transparent rubber cover upon said shell, means defining an air chamber in said cover opposite one end of said diameter, and rubber means of substantial dissipative resistance upon a wall portion of said chamber defining means in alignment with said diameter.

7. A submarine signal detector comprising a bodily vibratile, substantially spherical shell, a pair of inertia type signal translating units within said shell and in alignment along a diameter thereof, means coupling the driving element of each of said units to said shell, and means for producing a phase shift between the two opposed forces acting upon said shell along said diameter due to compressional wave signals, said means comprising an air-filled capsule adjacent one end of said diameter and a covering upon the outer surface of said capsule and having substantial dissipative resistance.

ROBERT BLACK, Jr.
FRANK F. ROMANOW.

REFERENCES CITED

The following references are of record in the file of this patent:

UNITED STATES PATENTS

| Number | Name | Date |
| --- | --- | --- |
| 1,101,830 | Berger | June 30, 1914 |
| 1,393,471 | Wegel | Oct. 11, 1921 |
| 768,568 | Mundy | Aug. 23, 1904 |
| 1,129,565 | Gardner | Feb. 23, 1915 |
| 2,104,433 | Marshall | Jan. 4, 1938 |
| 2,086,649 | Thuras | July 13, 1937 |
| 1,869,178 | Thuras | July 26, 1932 |